June 3, 1969   A. L. DE PIZZOL   3,447,818
DOCUMENT IDENTIFICATION AND PROTECTION SYSTEM
Filed Aug. 9, 1966
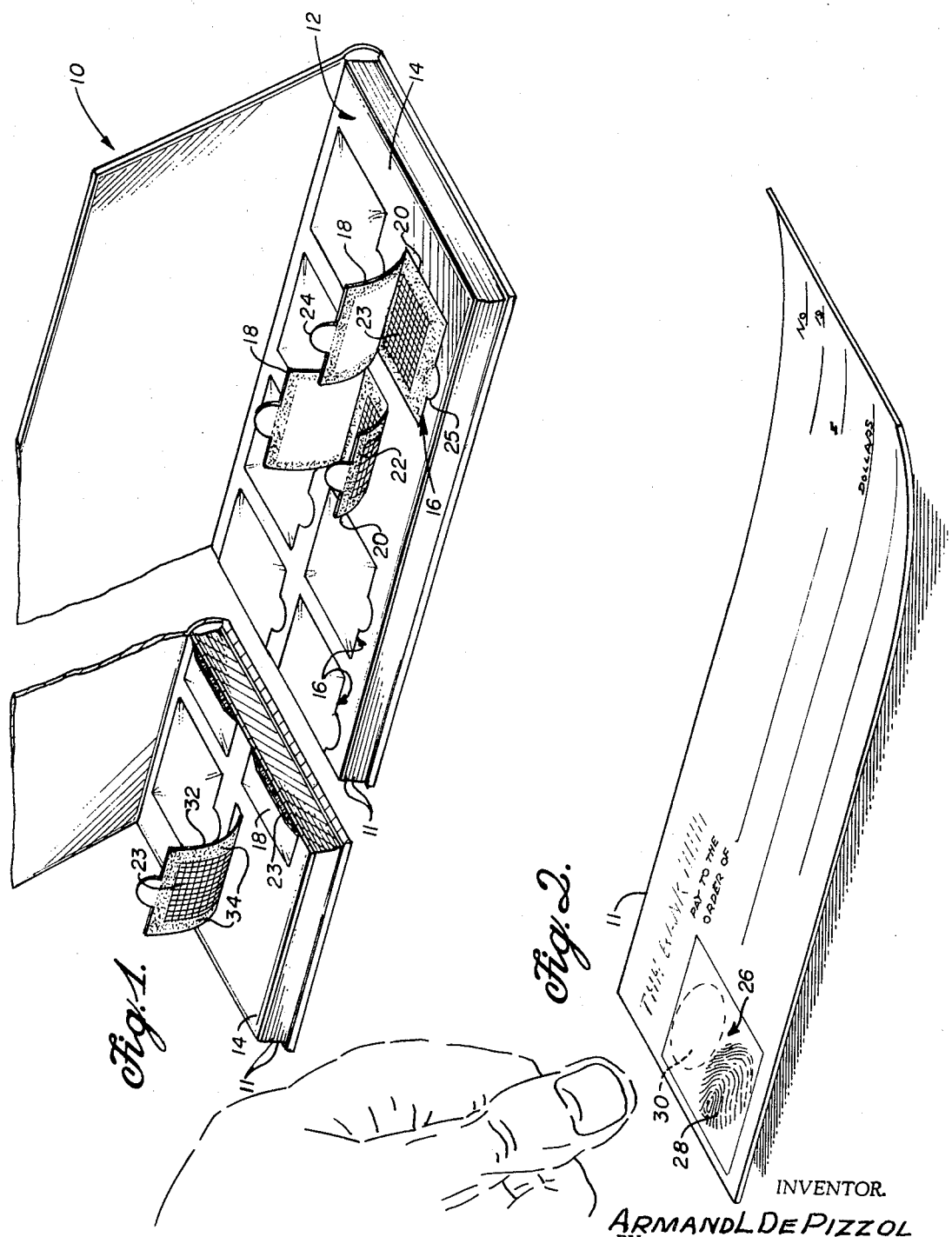
INVENTOR.
ARMAND L. DE PIZZOL
BY
ATTORNEYS

United States Patent Office 3,447,818
Patented June 3, 1969

3,447,818
DOCUMENT IDENTIFICATION AND
PROTECTION SYSTEM
Armand L. De Pizzol, 234 Corbett Ave.,
San Francisco, Calif. 94114
Continuation-in-part of application Ser. No. 546,660,
May 2, 1966. This application Aug. 9, 1966, Ser.
No. 575,214
Int. Cl. B42d 15/00
U.S. Cl. 283—7                    9 Claims

ABSTRACT OF THE DISCLOSURE

A document identification and protection system in which the fingerprint of the person transferring the document is compared with a fingerprint of the person authorized to actually transfer the document which has been preprinted on the document by the document issuing authority. The entire document is, by a single treatment, protected from ink eradicators and made responsive to invisible ink. Ink reservoirs for the taking of fingerprints are also provided.

---

This is a continuation-in-part of applicant's copending application Serial No. 546,660, filed May 2, 1966, entitled Document Identification System, now abandoned.

The present invention relates generally to a document identification and protection system and more particularly to a process and apparatus for comparing a fingerprint of a person actually passing a document, such as a bank draft (check), with a fingerprint of the person, who is in fact authorized to pass the document (draw from the bank checking account).

Various systems have been devised in the past, utilizing fingerprints, for identifying documents such as checks, wills, stock certificates, deeds, bonds, birth certificates and other legal documents, wherein it is preferable to acquire positive identification of the person signing the document. Typical of such systems are the check cashing identification schemes utilizing unfoldable and foldable flaps or sheets of material permanently attached to the check or document, or adapted to be attached during the cashing or processing procedure. Further typical with such prior schemes, the person cashing the check or processing the document may be required to carry an identification card having an impression of his fingerprint thereon, which card has been authenticated by an authorized person, whereby a visual comparison of the fingerprints can be made. Accordingly, it may be seen that prior check identification schemes in general require the permanent attachment of some form of identifying tab or pad adapted to receive the impression of a fingerprint either when printing, or when subsequently cashing, the checks. Additionally, the systems generally require that the person signing the check, or the establishment cashing the check, have some form of permanent identification record of that person on hand.

The present invention overcomes the above-noted shortcomings of the prior art while providing a simple, efficent system for verifying the identity of a person signing a check, while retaining a permanent record of his identity. Although the invention is herein described as a check cashing identification system for which it is particularly well suited, it is to be understood that the process and apparatus is equally adaptable to the identification of written documents in general.

Accordingly, it is an object of the present invention to provide a check cashing, identification system whereby a cursory identification can be made at the time of cashing the check to determine if the person signing the check is the person authorized to draw on the account.

It is another object of the invention to provide a process and apparatus utilizing a conventional check book modified in accordance with the invention, wherein the identifying process is rapid and neat and thereby acceptable to both parties involved in the cashing process.

It is still another object of the invention to provide a check cashing, identification system wherein the checks each have printed thereon a fingerprint of the person authorized to draw on the account.

It is yet another object of the invention to provide a check cashing identification system wherein fingerprint ink is made readily available, at the time of cashing the check, in the form of a plurality of expendable gummed patches or labels mounted on a surface within the check book each containing a small reservoir of ink.

It is yet a further object of the invention to provide a check cashing identification system wherein a visual comparison can be made of two fingerprints at the time of cashing the check and a permanent identifying fingerprint is recorded on the check, without in any way deforming the check so as to allow it to be processed through bank computer systems.

Another object of the present invention is to provide a document which is treated with a substance which protects it from alteration through the use of ink eradicators and at the same time makes it responsive to invisible ink.

Additional objects and advantages will be apparent from the specification in conjunction with the drawings, in which:

FIG. 1 is a perspective view of one conventional type of check book or folder modified in accordance with the invention concepts; and FIG. 2 is a perspective view of the face of a check from the check book of FIG. 1, modified in accordance with the invention.

Briefly, the process and apparatus of the invention utilizes a check book of generally conventional configuration, containing bank checks which are modified in accordance with the invention by having the depositor's thumb print or fingerprint printed on each check. The check book itself is further modified to provide means, readily available, for subsequently applying a fingerprint on the check adjacent to the printed print, whereby an immediate visual comparison of the prints may be made at the time of cashing the check, while providing a fingerprint of the person cashing the check and thus a permanent record for identification of the person at a later date if such identification is desired.

Referring to FIG. 1, a check book 10 of any of the present conventional configurations, defining a plurality of printed checks 11, is modified to include at least one surface 12 of an additional page or leaf 14 within the record portion of the book 10. The surface 12 could be a surface on the back of the cover of the book, or one of any extra pages or leafs in the book. A plurality of gummed labels or patches 16 secured to the surface 12 in a suitable arrangement. The number of patches 16 generally equals the number of checks 11 in the book 10, such that upon using a patch it can be removed from the book and thrown away. Thus, the check book is kept neat and orderly.

The patches 16 may be of various designs and are detachably secured to the surface 12 in various manners. By way of example only, the patches 16 may resemble a small envelope having a top and bottom sheet 18 and 20, respectively, sealed together around the peripheries thereof, to provide a small, flat volume therewithin, wherein is disposed and stored a small layer or reservoir 23 of ink. The bottom sheet 20 thereof may be provided with a gummed lower surface, indicated by numeral 22, whereby the patches 16 are secured to the surface 12. The top sheet 18 may have a tab 24 integrally formed therewith, to provide means for gripping the top sheet and peeling it back from the bottom sheet 20 thereby exposing the ink reservoir 23 therein. The lower sheet 20 also may have a tab 25 integrally formed therewith to provide means for gripping the bottom sheet 20 to pull it from the surface 12 after the patch 16 has been used. Thus, as each patch 16 is used it is detached from the surface 12 and discarded.

Referring to FIG. 2, there is shown by way of example only, the check 11, modified in accordance with the invention to include a blank space 26 of sufficient size to allow the disposition of two fingerprints thereon in adjacent relation. A fingerprint 28 of the depositor is printed on one half of the space 26, with space adjacent thereto for a second fingerprint, shown in phantom line and generally indicated by numeral 30, which second fingerprint is subsequently applied to the check 11 during the cashing procedure. It is to be noted that there are accordingly no obstructions or appendages of any kind secured to, or in any way made a part of, the check 11. Thus, unlike most prior art check cashing identification systems which do have appendages integrally secured or formed therewith, the check of the present invention is readily processed by means of a bank's conventional computer system.

It is to be understood that although the patches 16 have been herein described formed of two sheets of a suitable material preferably impervious, viz, top and bottom sheets 18 and 20, the ink reservoir 23 could be deposited during manufacture thereof upon the lower surface of a single sheet 32 as an integral part thereof. Referring to FIG. 1, the broken-out portion of the book 10 depicts such an alternative configuration, which comprises the sheet 32 detachably secured to the surface 12 by means of peripheral gummed surfaces 34. Thus, one sheet of the double-sheet reservoir version of the above description is disposed with, and the ink reservoir 23 is disposed between the single sheet 32 and the surface 12. The ink reservoir 23 is thereafter exposed for use by simply peeling the single sheet 32 back against the surface 12, preferably leaving it attached during use to the surface along only one edge thereof. After the patch is used, the single sheet is removed from the surface 12 and discarded, leaving a clean surface 12 where the patch was originally secured. In a similar manner it is contemplated that the entire lower surface of sheet 32 can be covered with an adhesive containing ink.

To overcome the objectionable use of heavy black inks such as commonly used in the past for fingerprinting, the invention contemplates the use of an invisible fingerprint ink such as known in the art, and as described for example, in the U.S. Patent No. 2,082,735 issued to William Heinecke. Invisible inks of this type leave no residual material on the fingers after they have been used, although after being applied to treated paper and allowed to oxidize, they produce a visible print. The space or volume required for deposition of these inks is very small since such inks form a very thin layer on the surface of the containing sheet of material.

If invisible ink is to be employed, it is necessary to treat the document (check) which is to receive the ink with a polyphenolic substance such as trihydroxybenzoic acid (gallic acid) as taught in the aforementioned patent to Heinecke. While it is only absolutely necessary to so treat the patch on the document where the fingerprint is to be applied, a most useful and unexpected result is obtained by treating the entire document. Besides the property of developing invisible inks, polyphenolic substances have the property, which is recognized for the first time by the present invention, of reacting with ink eradicators in a manner which produces visual evidence that ink eradicator has been applied to the document. At present almost all checks are specially treated chemically to be protected against alteration using ink eradicator and the process for providing such protection is at least as costly as treating the check to be responsive to invisible ink. Thus, when a document is treated as taught herein to be responsive to invisible ink, it automatically becomes protected against ink eradicators whereby further treatment for protection purposes is unnecessary.

In keeping with the invention, a plurality of expendable ink reservoirs 23 are readily made available at the time of cashing a check, along with a like plurality of checks each of which has a fingerprint of the depositor printed thereon. Thus, in use, when the check 11 is cashed, the person presenting the check opens one of the gummed patches 16 on the surface 12 of the check book 10 to thereby expose an ink reservoir 23. In the presence of the clerk or like person who is to cash the check, he presses his thumb or finger against the exposed ink reservoir and then applies his fingerprint to the space 30 on the check 11, adjacent the printed fingerprint 28. The clerk may make a visual comparison of the two fingerprints to determine that there is no obvious or noticeable difference between the prints. A gummed patch 16 is then completely detached from the surface 12 and is simply thrown away. The procedure is thus simple and neat and requires very little effort or extra time, and as may be seen provides a permanent identification record of the person presenting the check on the check itself. Such fingerprint would provide positive proof of bad check passing, for example, at such time as the impressed fingerprint is matched to a particular individual's fingerprints in the F.B.I. fingerprint file. Thus, while a person may not hesitate to pass a bad check by forging a signature, there would be definite reluctance on his part to pass the check if it meant leaving his fingerprint behind as a permanent record. Accordingly, the risk involved and the money lost through the cashing of bad checks would be substantially reduced.

Although the invention is described with respect to generally a single embodiment thereof, it is to be understood that various modifications can be made within the spirit of the invention, and thus it is not intended to limit the scope thereof except as defined in the following claims.

What is claimed is:

1. An identification system for positive identification of a person passing a document to determine if he is in fact the person authorized to pass the document comprising:
   (a) a document folder means;
   (b) a document secured within said document folder means and having printed thereon by the document issuer an identifying fingerprint of the authorized person;
   (c) ink reservoir means having invisible ink stored therein detachably secured within the folder means; and
   (d) said document having a space treated to have a polyphenolic coating thereon for receiving a second fingerprint obtained from use of said ink reservoir means for comparison with the pre-printed fingerprint.

2. The system of claim 1 wherein said folder means comprises a check book of a plurality of checks and said ink reservoir means comprises a substantially equal plurality of ink reservoirs.

3. The system of claim 1 wherein said folder means further comprises a selected leaf integrally secured therewith, and providing a surface for detachably receiving said ink reservoir means.

4. The system of claim 3 wherein said ink reservoir means each comprise at least one sheet of material gummed about the periphery thereof and secured therealong to the surface of said leaf to confine their respective ink reservoirs, said sheet of material being adapted to be peeled back to expose the ink reservoir confined therewithin.

5. The system of claim 3 wherein said ink reservoir means comprise reservoirs of invisible ink disposed as layers upon respective sheets of material.

6. The system of claim 3 wherein said ink reservoir means comprises two sheets of material sealed together about the peripheries thereof to define a small volume therewithin, said volume containing therein a thin layer of fingerprint ink, one of invisible said sheets having a gummed back surface for detachably securing the ink reservoir means to the surface of said selected leaf, said sealed sheets being adapted to allow peeling back one sheet thereof to expose said fingerprint ink, said gummed sheet being detachable from its position on said selected leaf upon use of the ink reservoir for discarding said ink reservoir means.

7. The system of claim 3 wherein said ink reservoir means comprises a sheet of material with adhesive containing ink deposited on one side thereof.

8. A positive identification and protected document comprising in combination:
   a fingerprint printed by the document issuer on the document;
   an area of the document generally adjacent to said printed fingerprint for receiving the print of a finger coated with invisible ink; and
   a polyphenolic coating over the entire document to make it responsive to invisible ink and protect it against alteration through the use of the ink eradicator.

9. A method for making a positive identification of the owner of a document such as a personal check while providing a permanent identification record of the person actually presenting and processing the document comprising the steps of:
   (a) providing a pre-printed fingerprint of the depositor on each of a plurality of checks in a checkbook by the check issuing authority during the check issuing procedure;
   (b) impressing a fingerprint of the person when actually presenting and processing the check from ink reservoir means detachably secured within said check book, whereby a visual comparison can be made between the pre-printed and impressed fingerprints;
   (c) providing a plurality of expendable ink reservoirs within said check book;
   (d) exposing an ink reservoir each time it is desired to cash a check;
   (e) pressing a selected finger against the exposed ink reservoir to coat the end thereof with ink;
   (f) applying the coated finger to a surface of the check to form said impression adjacent the printed fingerprint thereon; and
   (g) detaching and discarding said ink reservoir means upon use thereof from within said check book.

References Cited

UNITED STATES PATENTS

| | | | |
|---|---|---|---|
| 493,223 | 3/1893 | Schafer | 283—7 |
| 878,366 | 2/1908 | Evans | 283—7 |
| 1,536,991 | 5/1925 | Varetoni | 118—31.5 |
| 2,082,735 | 6/1937 | Heinecke | 117—0.5 |

LAWRENCE CHARLES, *Primary Examiner.*